United States Patent
Ho et al.

(10) Patent No.: US 12,400,478 B2
(45) Date of Patent: Aug. 26, 2025

(54) SHORT RANGE RADAR FOR FACE TRACKING

(71) Applicant: Meta Platforms Technologies, LLC, Menlo Park, CA (US)

(72) Inventors: John Ho, Sunnyvale, CA (US); Jiang Zhu, Cupertino, CA (US); Wei Huang, San Diego, CA (US); Boon Shiu, Palo Alto, CA (US); Bruno Cendon Martin, Palo Alto, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 390 days.

(21) Appl. No.: 18/105,595

(22) Filed: Feb. 3, 2023

(65) Prior Publication Data
US 2024/0265732 A1    Aug. 8, 2024

(51) Int. Cl.
*G06V 40/16*    (2022.01)
*G01S 13/89*    (2006.01)

(52) U.S. Cl.
CPC ............ *G06V 40/174* (2022.01); *G01S 13/89* (2013.01); *G06V 40/168* (2022.01)

(58) Field of Classification Search
CPC .... G06V 40/174; G06V 40/168; G01S 13/89; G01S 7/411
See application file for complete search history.

(56) References Cited

U.S. PATENT DOCUMENTS

| | | |
|---|---|---|
| 11,346,943 B1 | 5/2022 | Brian et al. |
| 2017/0105662 A1* | 4/2017 | Silawan ............ A61B 5/14542 |
| 2019/0204599 A1 | 7/2019 | Abbott |
| 2020/0166609 A1 | 5/2020 | Trotta et al. |
| 2023/0077010 A1* | 3/2023 | Zhang ................ G06V 40/171 |
| 2023/0368453 A1* | 11/2023 | Jakubzak ............... A63F 13/25 |

FOREIGN PATENT DOCUMENTS

WO    2021231900 A1    11/2021

OTHER PUBLICATIONS

Gouveia C., et al., "A Review on Methods for Random Motion Detection and Compensation in Bio-Radar Systems," Sensors, Jan. 31, 2019, vol. 19, No. 3, 17 pages.
Hof E., et al., "Face Verification Using mmWave Radar Sensor," International Conference on Artificial Intelligence in Information and Communication (ICAIIC), Feb. 19-21, 2020, pp. 320-324.

* cited by examiner

*Primary Examiner* — Phuoc Tran
(74) *Attorney, Agent, or Firm* — Greenberg Traurig, LLP

(57) ABSTRACT

A radar transmit antenna of a head mounted device transmits a transmission radar signal to a face-region. A radar receiver antenna of the head mounted device receives a return radar signal from the face-region. The return radar signal is matched to a selected expression signal included in a plurality of expression signals stored in an expression database.

20 Claims, 7 Drawing Sheets

SHORT RANGE RADAR FOR FACE TRACKING

TECHNICAL FIELD

This disclosure relates generally to radar sensing, and in particular to face tracking.

BACKGROUND INFORMATION

Radar sensors have historically been used for imaging and sensing aircraft and marine vessels at relatively long range (e.g. 10 meters or more). More recently, radar sensors have been utilized in the automobile industry to facilitate active cruise control or parking assistance.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
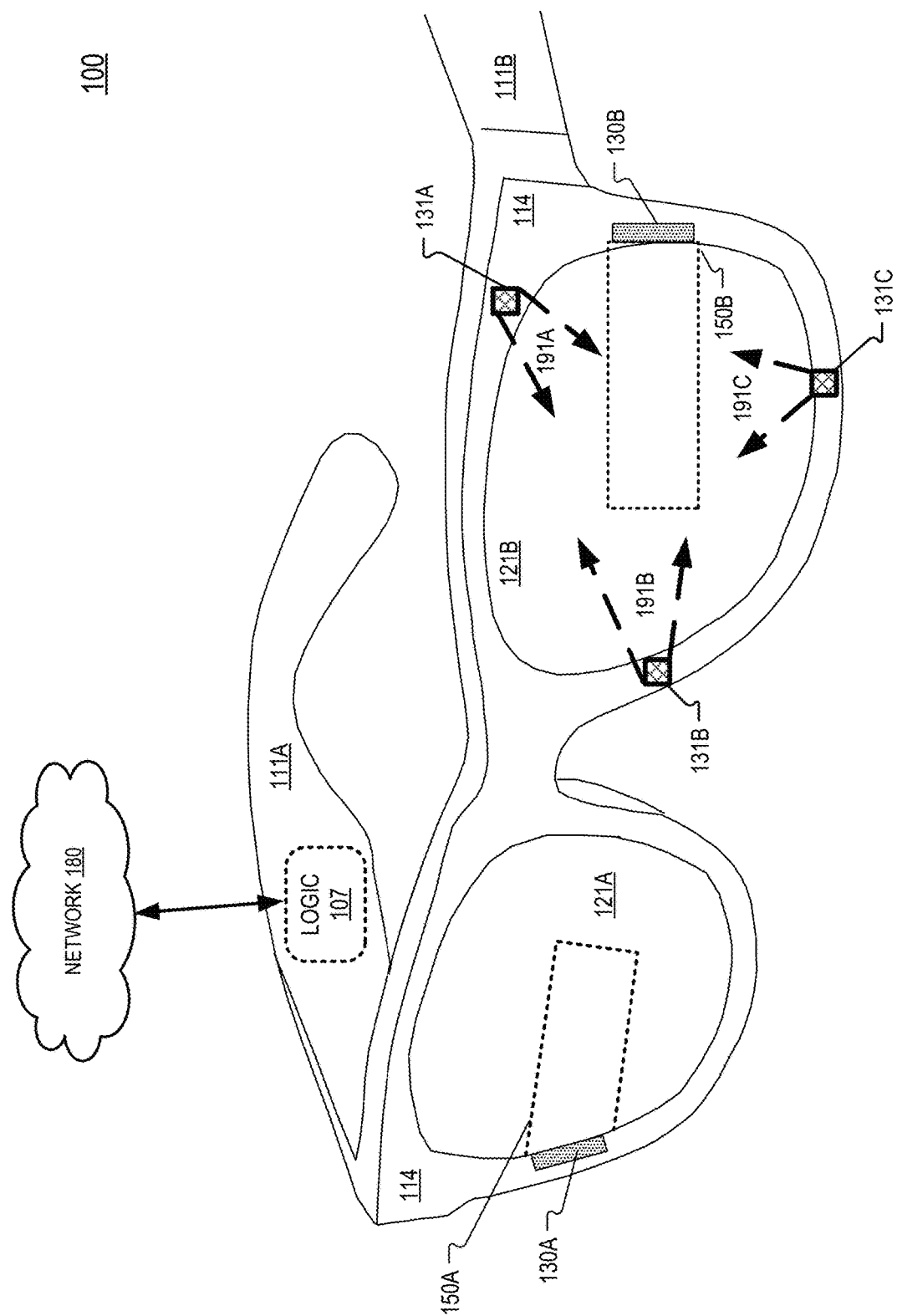
FIG. 1A illustrates a head mounted display (HMD) that may include a near-eye system that includes a radar system, in accordance with aspects of the disclosure.

Embodiments of short range radar for face tracking are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 µm.

In aspects of this disclosure, the term "transparent" may be defined as having greater than 90% transmission of light. In some aspects, the term "transparent" may be defined as a material having greater than 90% transmission of visible light.

In addition to marine, aircraft, and automobile application of radar, prior technologies have utilized radar on a smartphone to identify hand gestures. In other contexts, cameras have been used to image the face of the user and extract expressions from the images. In implementations of the disclosure, radar antennas included in a head mounted device (such as smartglasses or a head mounted display (HMD)) may be used for face tracking. The radar antennas of the head mounted device may be configured for extremely short range radar that is configured to sense objects at less than 100 millimeters, for example. A receive radar antenna may be used to receive a radar return signal and match the radar return signal to a selected expression signal included in an expression database. A selected avatar expression that is associated with the selected expression signal may then be animated onto an avatar of a user of the head mounted device. Using radar techniques instead of cameras for face tracking may decrease the electrical power, reduce processing resources, and reduce the processing time to recognize expressions of users. Using radar techniques may also be less sensitive to ambient light conditions and provide better results when occlusions (e.g. hair) is blocking the face. These and other embodiments are described in more detail in connection with FIGS. 1A-5.

FIG. 1A illustrates a head mounted display (HMD) 100 that may include a near-eye system, in accordance with aspects of the present disclosure. HMD 100 includes frame 114 coupled to arms 111A and 111B. Lens assemblies 121A and 121B are mounted to frame 104. Lens assemblies 121A and 121B may include a prescription lens matched to a particular user of HMD 100. The illustrated HMD 100 is configured to be worn on or about a head of a wearer of HMD 100.

In the HMD 100 illustrated in FIG. 1A, each lens assembly 121A/121B includes a display waveguide 150A/150B to direct image light generated by displays 130A/130B to an eyebox region for viewing by a user of HMD 100. Displays 130A/130B may include a beam-scanning display that includes a scanning mirror, for example. While HMD 100 is illustrated as a head mounted display, implementations of the disclosure may also be utilized on head mounted devices (e.g. smartglasses) that don't necessarily include a display.

Lens assemblies 121A and 121B may appear transparent to a user to facilitate augmented reality or mixed reality to enable a user to view scene light from the environment around them while also receiving image light directed to their eye(s) by, for example, waveguides 150. Lens assemblies 121A and 121B may include two or more optical layers for different functionalities such as display, eye-tracking, face tracking, and optical power. In some embodiments, image light from display 130A or 130B is only directed into one eye of the wearer of HMD 100. In an embodiment, both displays 130A and 130B are used to direct image light into waveguides 150A and 150B, respectively.

Frame 114 and arms 111 may include supporting hardware of HMD 100 such as processing logic, wired and/or wireless data interface for sending and receiving data, graphic processors, and one or more memories for storing data and computer-executable instructions. The processing logic may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

FIG. 1A illustrates example radar sensors 131A, 131B, and 131C (collectively referred to as radar sensors 131) that are disposed in different positions on HMD 100. In different implementations, more or fewer radar sensors 131 may be implemented in a head mounted device. Radar sensor 131A transmits transmission radar signal 191A directed to a face-region that a face of a wearer of HMD 100 will occupy. Radar sensor 131B and radar sensor 131C may also generate transmission radar signals 191B and 191C directed to the face-region that a face of a wearer of HMD 100 will occupy. Radar sensors 131 are disposed on or in frame 114 of HMD 100, in FIG. 1A. Lens assembly 121B may be transparent or semi-transparent so that a wearer of HMD 100 can view their external environment through lens assembly 121B.

Processing logic 107 is illustrated as included in arm 111A of HMD 100, although processing logic 107 may be disposed anywhere in the frame 114 or arms 111 of HMD 100. Processing logic 107 may drive radar transmit antenna(s) of the radar sensors 131 and may receive a radar return signal from a radar receive antenna of the radar sensors 131. Processing logic 107 may also animate an avatar in response to receiving the return radar signal from one or more radar receive antennas. Processing logic may be communicatively coupled to wired or wireless network 180. In some implementations, animating an avatar in response to the return radar signals includes transmitting an updated avatar over network 180. Processing logic 107 may be included in a central processing logic of HMD 100 or be a stand-alone processor.

Figure 1B:
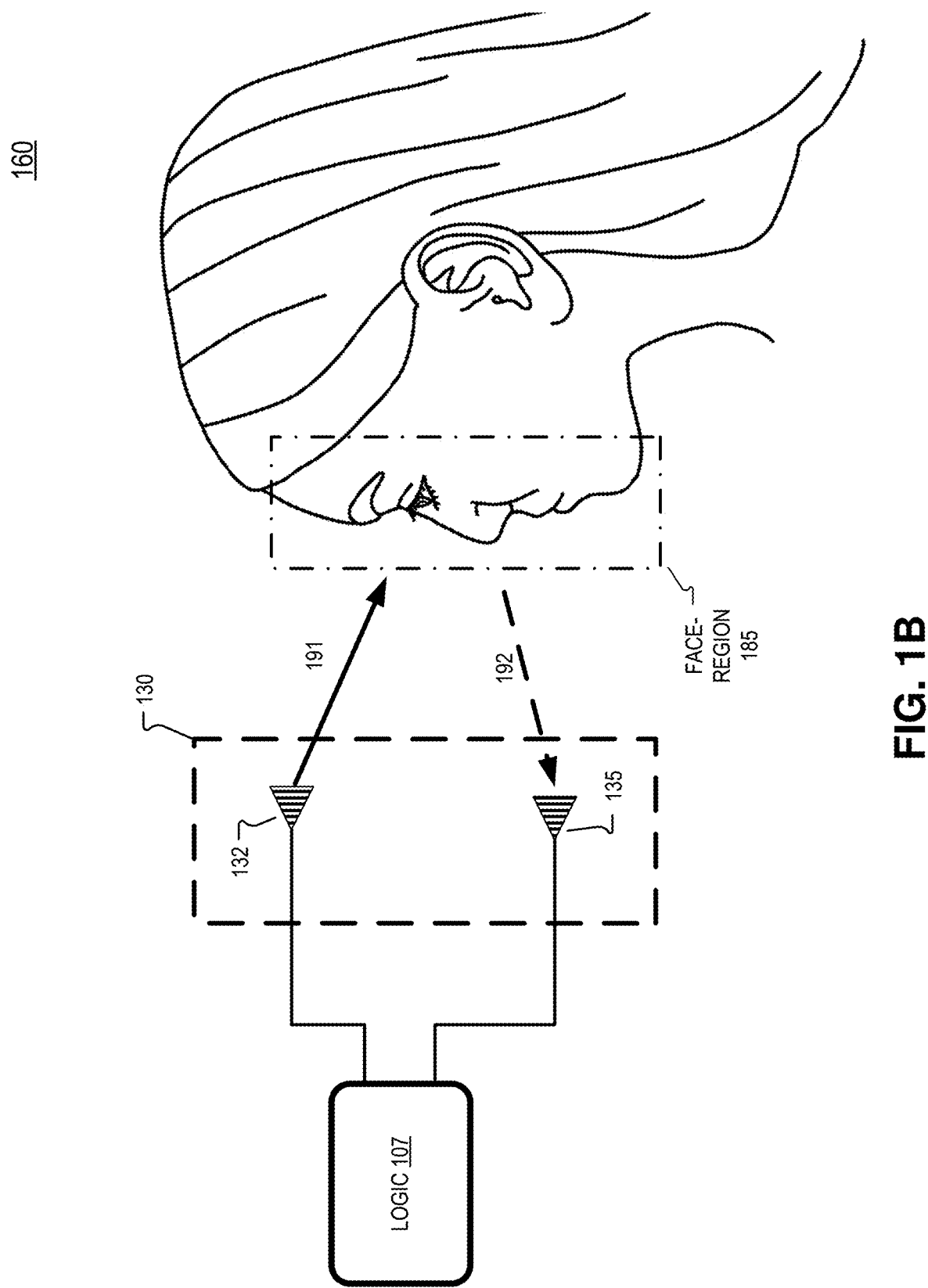
FIG. 1B illustrates an example system having processing logic driving a radar transmit antenna to transmit a transmission radar signal to a face-region, in accordance with aspects of the disclosure.

FIG. 1B illustrates an example system 160 having processing logic 107 driving radar transmit antenna 135 to transmit a transmission radar signal 191 to a face-region 185, in accordance with implementations of the disclosure. Transmission radar signal 191 may reflect/scatter from a face occupying face-region 185 and propagate back to radar receive antenna 135 as return radar signal 192. Processing logic 107 may then receive the return radar signal 192 from radar receive antenna 135.

In FIG. 1B, radar transmit antenna 132 and radar receive antenna 135 are included in a radar sensor 130. Radar sensor 130 may be packaged in a single electronic chip, for example. In other implementations, radar receive and/or transmit antennas are external from, and coupled to, a radar sensor. In some implementations, system 160 includes one radar transmit antenna and more than one (e.g. two, three, or four) radar receive antennas. In some implementations, the radar sensor uses 10 mW or less, when duty cycle is accounted for. The transmission radar signal 191 may be in the range of 5 GHz-100 GHz. In some implementations, transmission radar signal 191 is between 55 GHz and 80 GHz. Transmission radar signal 191 may be chirped. Parameters of the chirp such as bandwidth, slope, chirp repetition time, and frame repetition time may be varied to sense different aspects of the face region.

Figure 1C:
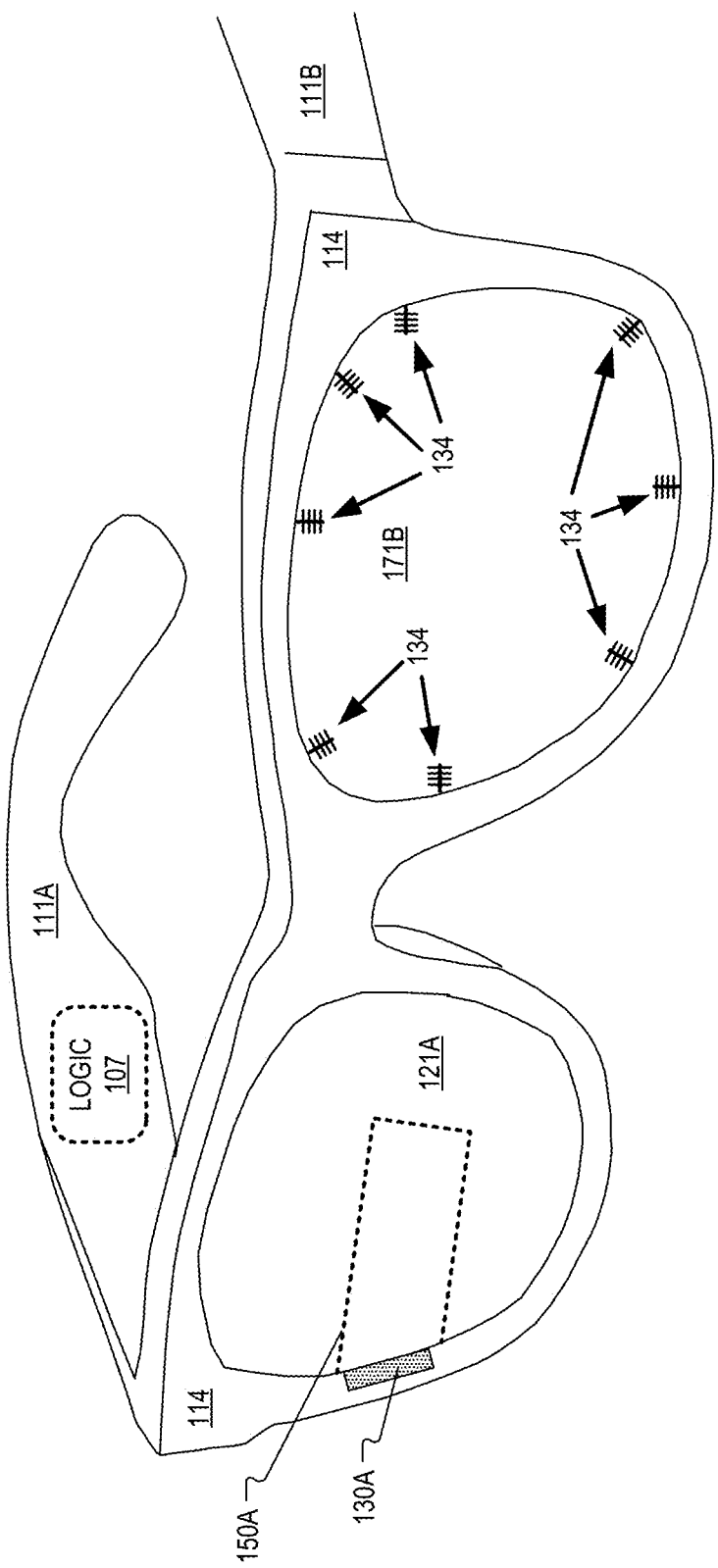
FIG. 1C illustrates an example head mounted device that includes radar antennas disposed in a lens layer of the head mounted device, in accordance with aspects of the disclosure.

FIG. 1C illustrates an example head mounted device 190 that includes radar antennas 134 disposed in a lens layer 171B of the head mounted device 190, in accordance with aspects of the disclosure. Although the radar antennas 134 are disposed in a field of view (FOV) of a user, the conductors used to form the antennas may be unnoticeable and/or unfocusable by a user wearing head mounted device 190. The conductors that form the radar antennas 134 may be transparent, semi-transparent, or opaque. In an implementation, a semiconductor that is substantially transparent to visible light forms the traces of radar antennas 134. Radar antennas 134 may include indium tin oxide (ITO) or copper, for example.

Figure 2C:
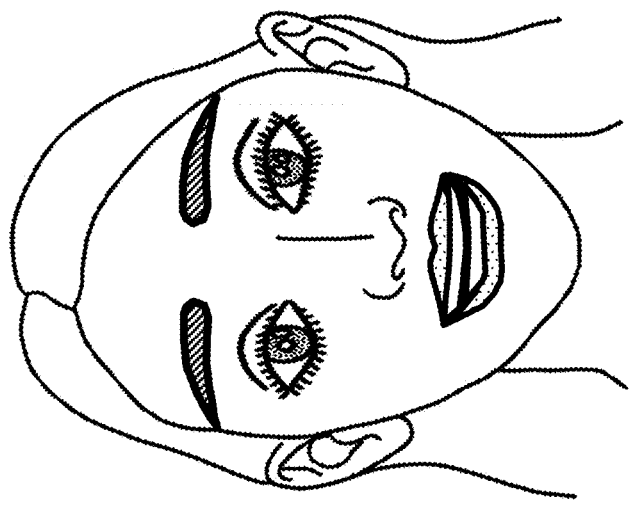
FIGS. 2A-2C illustrate three example expressions of a face, in accordance with aspects of the disclosure.
Figure 2B:
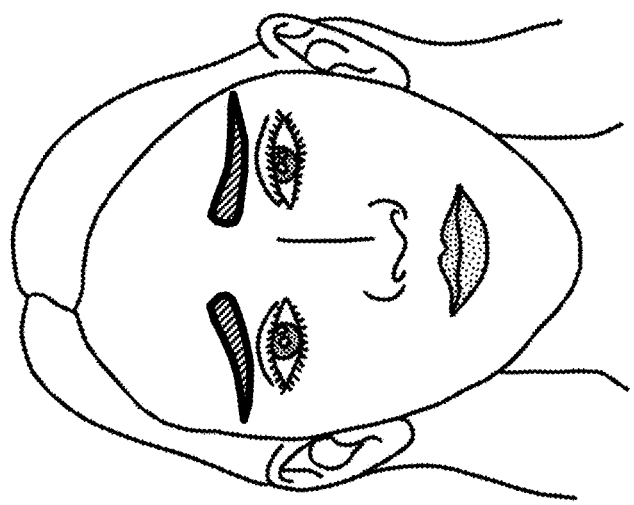
Figure 2A:
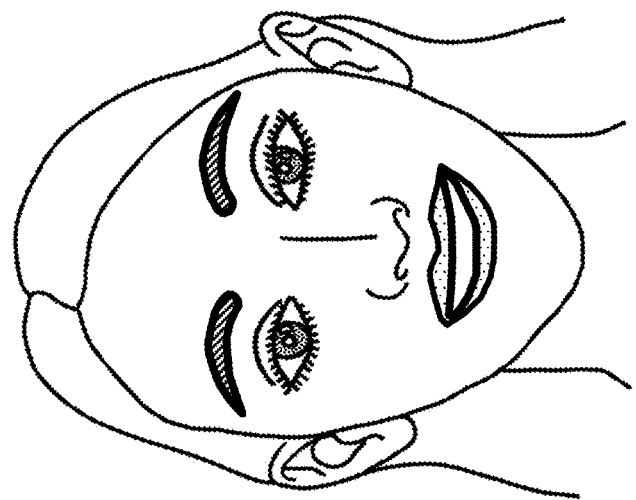

FIGS. 2A-2C illustrate three example expressions of a face. FIG. 2A illustrates a smiling person 221; FIG. 2B illustrates a frowning person 222; and FIG. 2C illustrates a surprised person 223.

Figure 3:
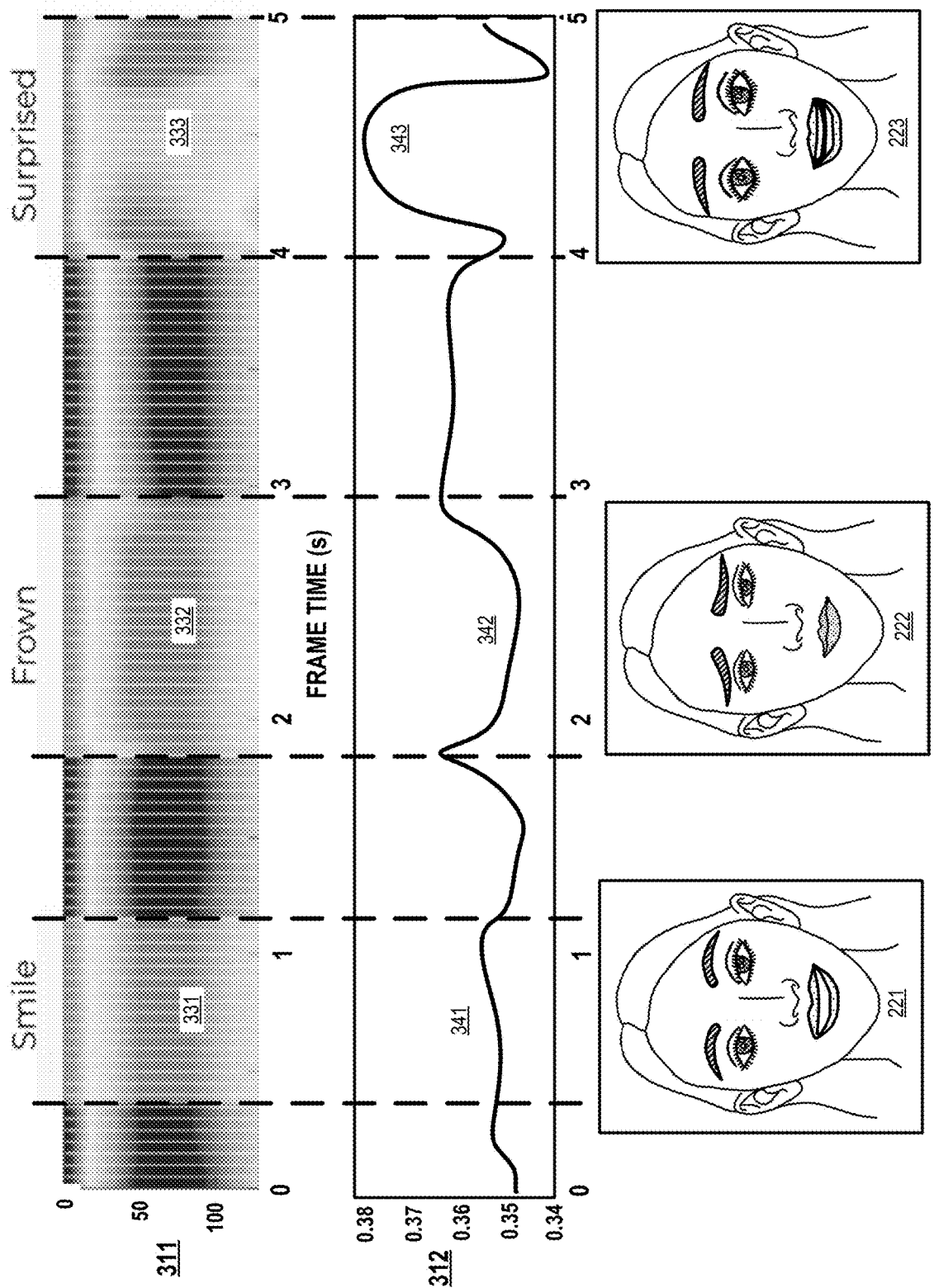
FIG. 3 illustrates radar signals corresponding to facial expressions, in accordance with aspects of the disclosure.

FIG. 3 illustrates radar signals corresponding to facial expressions, in accordance with aspects of the disclosure. Signal 311 shows a raw chirped return radar signal 311 over a five second period. Signal 312 is a feature extracted from the raw chirped return radar signal 311 over the same five second period where the feature amplitude is between 0.34 and 0.38 units. In the illustrated implementation, a portion 331 of raw chirped return radar signal 311 and a portion 341 of signal 312 is the return radar signal received by one or more radar receive antenna(s) (e.g. radar receive antenna 135) when a face-region includes a smiling person 221. Likewise, a portion 332 of raw chirped return radar signal 311 and a portion 342 of signal 312 is the return radar signal received by one or more radar receive antenna(s) when a face-region includes a frowning person 222 and a portion 333 of raw chirped return radar signal 311 and a portion 343 of signal 312 is the return radar signal received by one or more radar receive antenna(s) when a face-region includes a surprised person 223. Hence, a radar return signal can indicate a facial expression of a face occupying a face-region of a head mounted device.

In FIG. 3, signals 311 and 312 include measurements of depth, motion, and displacement of the region over a time period. In some implementations, the return radar signals that indicate a certain expression are measured over a time period that is one second or less. In some implementations, the return radar signals that indicate a certain expression are measured over a time period between 0.25 seconds and one second.

Figure 4:
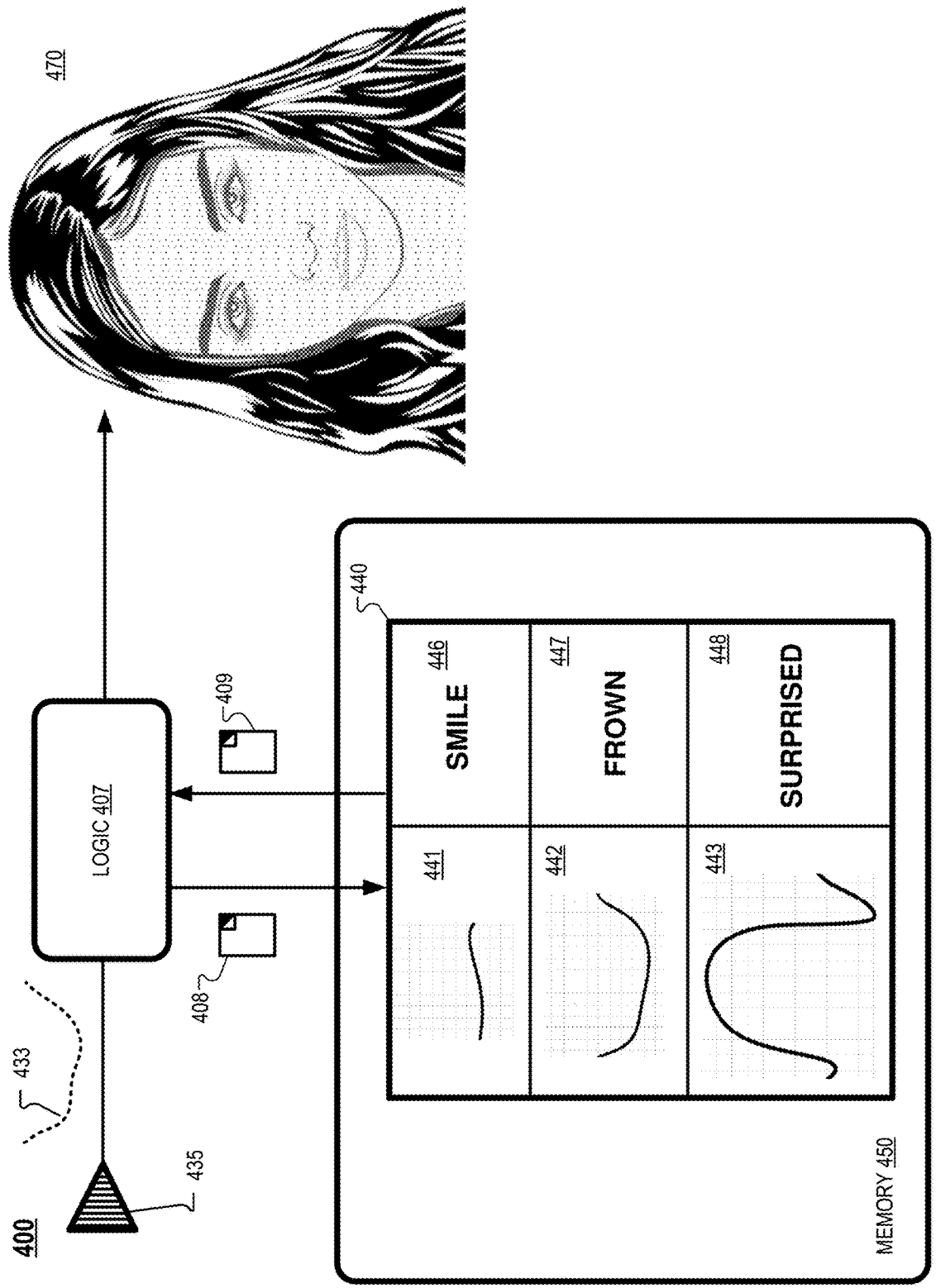
FIG. 4 illustrates an example system that may animate an avatar in response to a return radar signal, in accordance with aspects of the disclosure.

FIG. 4 illustrates an example system 400 that may animate an avatar in response to a return radar signal, in accordance with aspects of the disclosure. System 400 includes a radar receive antenna 435, processing logic 407, and a memory 450. Radar receive antenna 435 may be included in a radar sensor, for example. In some implementations, a plurality of radar receive antennas are included in system 400. Processing logic 407 is communicatively coupled to memory 450 in the example of FIG. 4 and memory 450 may be included in a head mounted device, in some implementations. Processing logic 407 may access memory 450 over a network connection, in some implementations.

In operation, processing logic 407 may receive return radar signal 433 from radar receive antenna 435. In some implementations, processing logic 407 receives return radar signal 433 from a plurality of radar receive antennas included in system 400. Processing logic 407 may send a query 408 based on return radar signal 433 to memory 450 to match return radar signal 433 to a selected expression signal included in a plurality of expression signals stored in expression database 440. In the example illustration of FIG. 4, the expression signals include smile expression signal 441, frown expression signal 442, and surprised expression signal 443. Also in the example illustration of FIG. 4, each expression signal in expression database 440 is associated with a selected avatar expression. Smile expression signal 441 is associated with avatar expression 446, frown expression signal 442 is associated with avatar expression 447, and surprised expression signal 443 is associated with avatar expression 448. Thus, if the selected expression signal is smile expression signal 441, the associated avatar expression is smile avatar expression 446 and smile avatar expression 446 is included in the return 409. Processing logic 407 may then animate avatar 470 with the avatar expression included in return 409.

In some implementations, matching the return radar signal to the selected expression signal includes comparing the return radar signal to the plurality of expression signals. The selected expression signal may be the closest comparison among the plurality of expression signals in database 440. In the illustrated example, return radar signal 433 may be closest to frown expression signal 442. Thus, frown expression signal 442 is the selected expression signal and frown avatar expression 447 is the selected avatar expression and included in return 409. Processing logic 407 may then animate avatar 470 with the selected avatar expression (in this example frown avatar expression 447). While only three examples are illustrated in the disclosure, of course, many different expressions and variations of expression may be included in expression database 440.

While a camera and images may be utilized to associate expression signals 441, 442, and 443 with avatar expressions 446, 447, 448, respectively, the images and camera are not necessary to determine what expression a person is making after database 440 is established. Rather the radar signature (e.g. signal 433) can be used to determine the expression the person is making.

Figure 5:
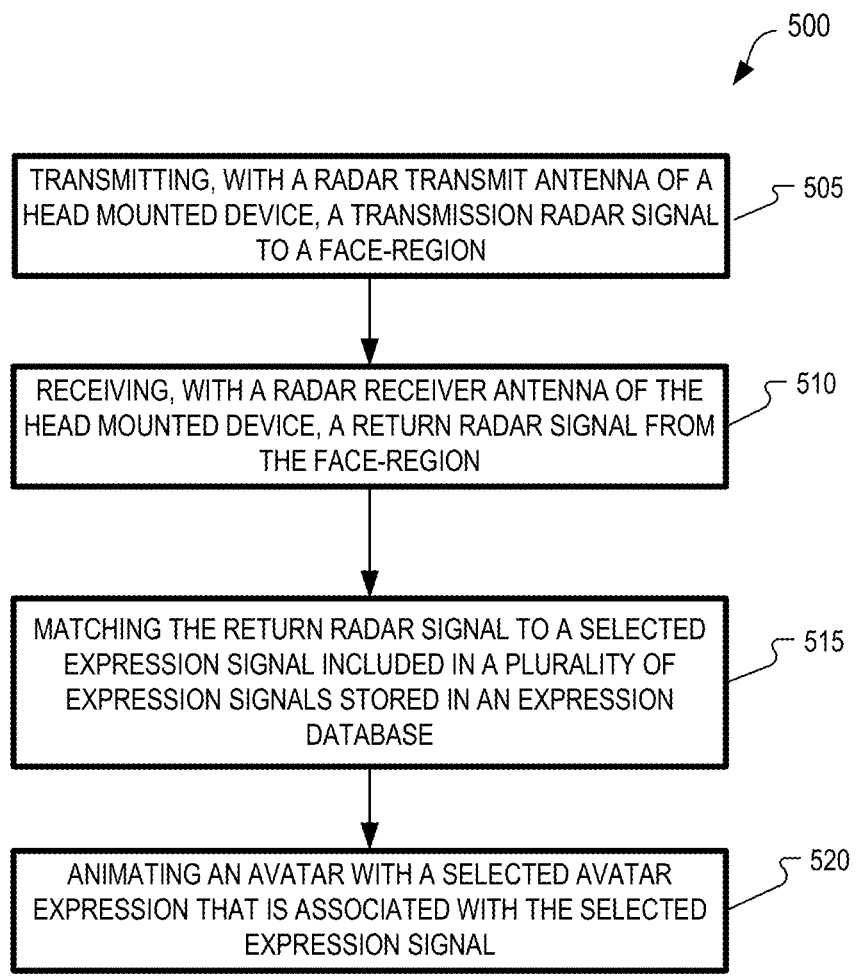
FIG. 5 illustrates a flow chart of an example process of animation from radar signals received by a head mounted device, in accordance with aspects of the disclosure.

FIG. 5 illustrates a flow chart of an example process 500 of animation from radar signals received by a head mounted device, in accordance with aspects of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. Processing logic 107 and/or 407 may execute some or all of the process blocks in process 500.

In process block 505, a radar transmit antenna of a head mounted device transmits a transmission radar signal to a face-region. In an implementation, the radar transmit antenna is located in a lens of the head mounted device that is secured by a frame of the head mounted device. The radar transmit antenna may be formed of a conductor that is substantially transparent to visible light.

In process block 510, a radar receiver antenna of the head mounted device receives a return radar signal from the face-region. In an implementation, the radar receive antenna is located in a lens of the head mounted device that is secured by a frame of the head mounted device. The radar receive antenna may be formed of a conductor that is substantially transparent to visible light.

In process block 515, the return radar signal is matched to a selected expression signal included in a plurality of expression signals stored in an expression database. In some implementations, matching the return radar signal to the selected expression signal includes comparing the return radar signal to the plurality of expression signals. The selected expression signal may be the closest comparison among the plurality of expression signals.

In process block 520, an avatar is animated with a selected avatar expression that is associated with the selected expression signal.

In some implementations of process 500, the radar transmit antenna and the radar receive antenna are configured to image the face-region at extremely short range that is less than 100 mm from the radar transmit antenna and radar receive antenna. In some implementations, animating the avatar includes transmitting an updated avatar over a wireless communication network.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. processing logic 107 or 407) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g. memory 450) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted device comprising:
    a radar transmit antenna;
    a radar receive antenna; and
    processing logic configured to:
        drive the radar transmit antenna to transmit a transmission radar signal to a face-region;
        receive, with the radar receive antenna, a return radar signal from the face-region;
        match the return radar signal to a selected expression signal included in a plurality of expression signals stored in an expression database; and
        animate an avatar with a selected avatar expression that is associated with the selected expression signal.

2. The head mounted device of claim 1, wherein the radar transmit antenna and the radar receive antenna are configured to image the face-region at extremely short range that is less than 100 mm from the radar transmit antenna and radar receive antenna.

3. The head mounted device of claim 1, wherein the selected avatar expression is one of frown, surprise, or smile.

4. The head mounted device of claim 1, wherein animating the avatar includes transmitting an updated avatar over a wireless communication network.

5. The head mounted device of claim 1, wherein matching the return radar signal to the selected expression signal includes comparing the return radar signal to the plurality of expression signals, the selected expression signal being the closest comparison among the plurality of expression signals.

6. The head mounted device of claim 1, wherein the radar transmit antenna is located in a lens of the head mounted device that is secured by a frame of the head mounted device.

7. The head mounted device of claim 6, wherein the radar transmit antenna is formed of a conductor that is substantially transparent to visible light.

8. The head mounted device of claim 1, wherein the radar receive antenna is located in a lens of the head mounted device that is secured by a frame of the head mounted device.

9. The head mounted device of claim 8, wherein the radar receive antenna is formed of a conductor that is substantially transparent to visible light.

10. The head mounted device of claim 1 further comprising:
    a memory coupled to the processing logic, wherein the expression database including the plurality of expression signals are stored in the memory.

11. A computer-implemented method comprising:
    transmitting, with a radar transmit antenna of a head mounted device, a transmission radar signal to a face-region;
    receiving, with a radar receiver antenna of the head mounted device, a return radar signal from the face-region;
    matching the return radar signal to a selected expression signal included in a plurality of expression signals stored in an expression database; and
    animating an avatar with a selected avatar expression that is associated with the selected expression signal.

12. The computer-implemented method of claim 11, wherein the radar transmit antenna is located in a lens of the head mounted device that is secured by a frame of the head mounted device.

13. The computer-implemented method of claim 12, wherein the radar transmit antenna is formed of a conductor that is substantially transparent to visible light.

14. The computer-implemented method of claim 11, wherein the radar receive antenna is located in a lens of the head mounted device that is secured by a frame of the head mounted device.

15. The computer-implemented method of claim 14, wherein the radar receive antenna is formed of a conductor that is substantially transparent to visible light.

16. The computer-implemented method of claim 11, wherein the radar transmit antenna and the radar receive antenna are configured to image the face-region at extremely short range that is less than 100 mm from the radar transmit antenna and radar receive antenna.

17. The computer-implemented method of claim 11, wherein the selected avatar expression is one of frown, surprise, or smile.

18. The computer-implemented method of claim 11, wherein animating the avatar includes transmitting an updated avatar over a wireless communication network.

19. The computer-implemented method of claim 11, wherein matching the return radar signal to the selected expression signal includes comparing the return radar signal to the plurality of expression signals, the selected expression signal being the closest comparison among the plurality of expression signals.

20. The computer-implemented method of claim 11, wherein the return radar signal over a time period is between 0.25 seconds and one second.

\* \* \* \* \*